(12) United States Patent
Carpenter

(10) Patent No.: US 7,241,023 B1
(45) Date of Patent: Jul. 10, 2007

(54) GRAVE MARKER ILLUMINATION ASSEMBLY

(76) Inventor: Alan A. Carpenter, 16 Mountain View Rd., Franklin, NJ (US) 07416

( * ) Notice: Subject to any disclaimer, the term of this patent is extended or adjusted under 35 U.S.C. 154(b) by 185 days.

(21) Appl. No.: 11/140,009

(22) Filed: May 31, 2005

(51) Int. Cl.
*F21L 4/00* (2006.01)
(52) U.S. Cl. .................. 362/183; 362/153; 362/431
(58) Field of Classification Search ............... 362/153, 362/153.1, 183, 184, 190, 228, 231, 286, 362/363, 386, 431
See application file for complete search history.

(56) References Cited

U.S. PATENT DOCUMENTS

| | | | | |
|---|---|---|---|---|
| 3,777,138 A * | 12/1973 | Metzler | ....................... | 362/431 |
| 4,977,488 A | 12/1990 | Spotts et al. | | |
| 5,171,088 A * | 12/1992 | Tellier et al. | ............... | 362/386 |
| 5,217,296 A | 6/1993 | Tanner et al. | | |
| 5,255,170 A | 10/1993 | Plamp et al. | | |
| 5,367,442 A * | 11/1994 | Frost et al. | .................. | 362/183 |
| 5,564,816 A | 10/1996 | Arcadia et al. | | |
| D379,942 S | 6/1997 | Spicer | | |
| 6,088,973 A | 7/2000 | Weiss | | |
| 6,174,078 B1 * | 1/2001 | Ohm et al. | .................. | 362/228 |
| 6,406,163 B1 * | 6/2002 | Yang | ........................... | 362/183 |
| 6,467,222 B2 | 10/2002 | Barnes | | |

* cited by examiner

*Primary Examiner*—Y. My Quach-Lee

(57) ABSTRACT

A grave marker illumination assembly includes a post that has a bottom end and a top end. A transparent housing has a bottom wall, a top wall and a peripheral wall. The housing is positioned on the top end of the post. A light emitting apparatus is positioned in the housing and is mounted on the top wall. The light emitting apparatus is configured to direct light downwardly through the bottom wall. A light power supply is electrically coupled to the light emitting apparatus. The light power supply comprises a rechargeable battery and a plurality of solar panels electrically coupled to the rechargeable battery. The solar panels are mounted on an upper surface of the top wall. The post is positioned adjacent to a grave marker so that the light emitting apparatus illuminates the grave marker.

4 Claims, 5 Drawing Sheets

US 7,241,023 B1

GRAVE MARKER ILLUMINATION ASSEMBLY

BACKGROUND OF THE INVENTION

1. Field of the Invention

The present invention relates to grave lighting devices and more particularly pertains to a new grave lighting device for illuminating a grave marker.

2. Description of the Prior Art

The use of grave lighting devices is known in the prior art. U.S. Pat. No. 5,255,170 describes an illuminated memorial assembly for positioning at a gravesite. Another type of grave lighting device is U.S. Pat. No. 5,564,816 which again includes a memorial assembly which may be positioned adjacent to a gravesite and which may be illuminated. A general lighting device may be found in U.S. Pat. No. 4,977,488 and includes a means for being solar powered.

While these devices fulfill their respective, particular objectives and requirements, the need remains for a device which is adapted for illuminating a grave marker and which is powered by solar panels. Additionally, the device should include multiple light emitters for allowing a user to select between white or black light. The white light will provide general light for a person positioned adjacent to the grave marker. The light emitters will also replace candles that are often placed at a grave marker.

SUMMARY OF THE INVENTION

The present invention meets the needs presented above by generally comprising a post that has a bottom end and a top end. A housing has a bottom wall, a top wall and a peripheral wall that is attached to and extends between the top and bottom walls. The housing comprises a substantially transparent material. The housing is positioned on the top end of the post. A light emitting apparatus is positioned in the housing and is mounted on the top wall. The light emitting apparatus is configured to direct light downwardly through the bottom wall. A light power supply is electrically coupled to the light emitting apparatus. The light power supply comprises a rechargeable battery and a plurality of solar panels electrically coupled to the rechargeable battery. The solar panels are mounted on an upper surface of the top wall. The post is positioned adjacent to a grave marker so that the light emitting apparatus illuminates the grave marker.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
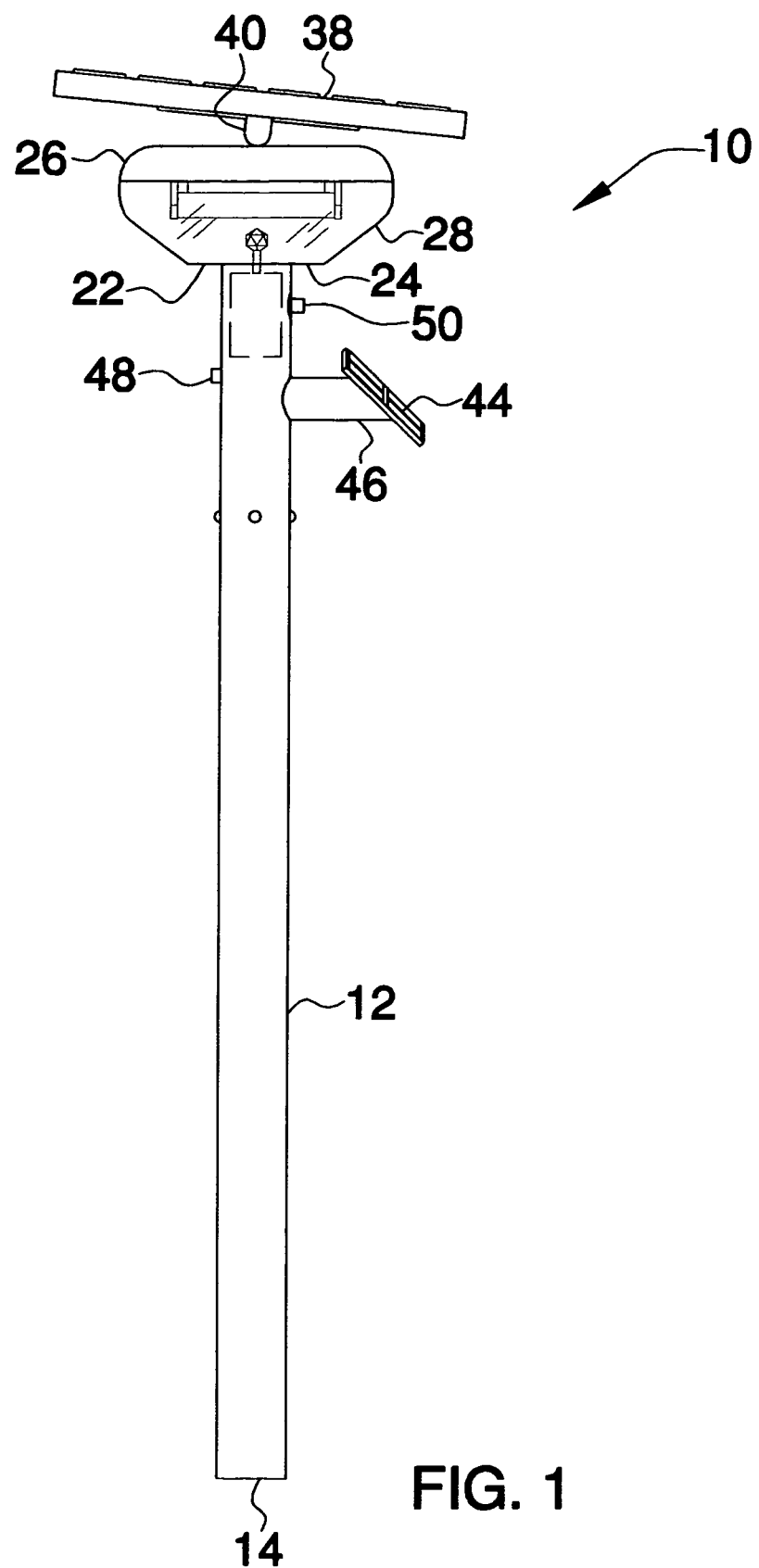
FIG. 1 is a side view of a grave marker illumination assembly according to the present invention.
Figure 2:
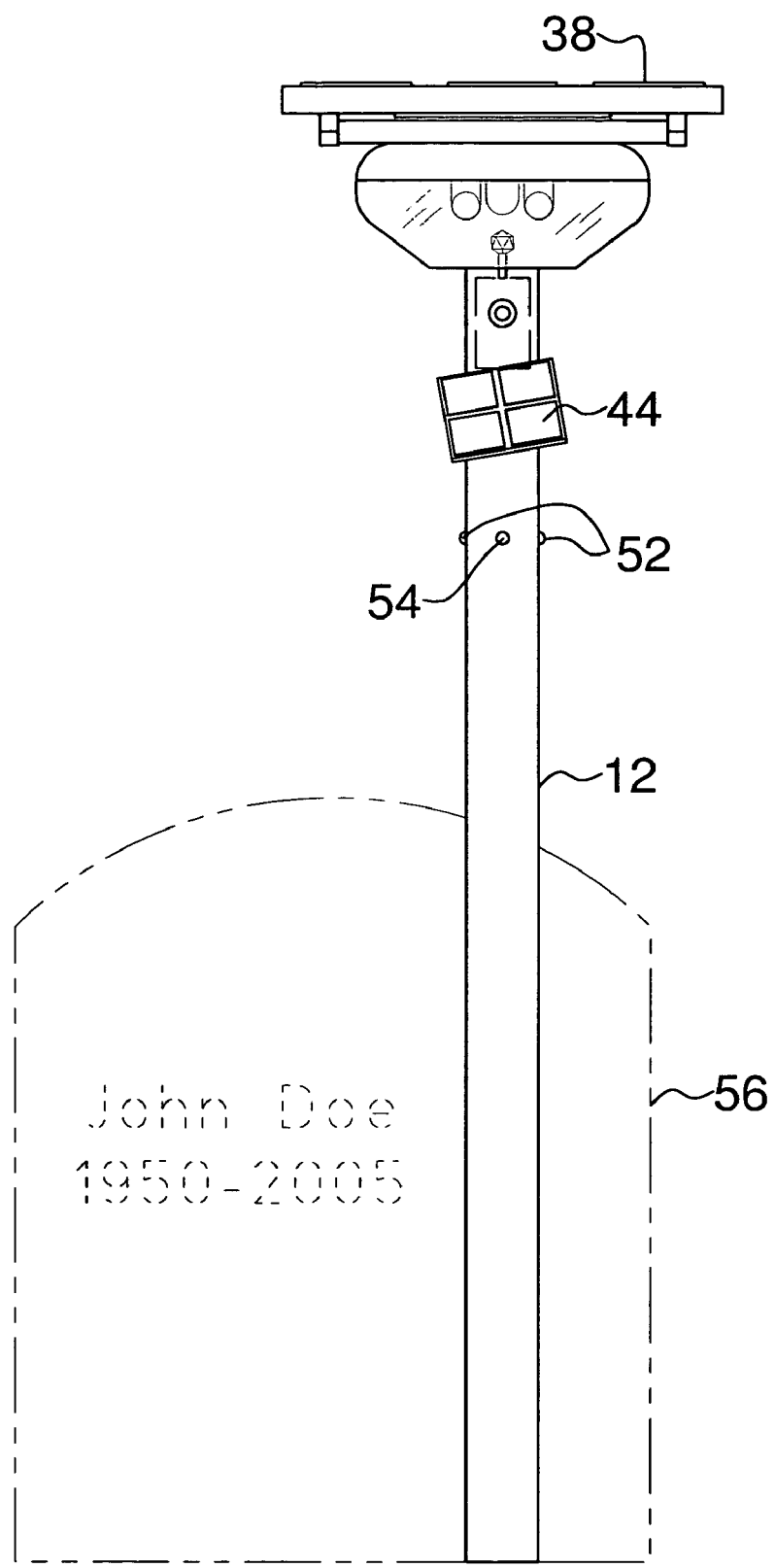
FIG. 2 is a front in-use view of the present invention.
Figure 3:
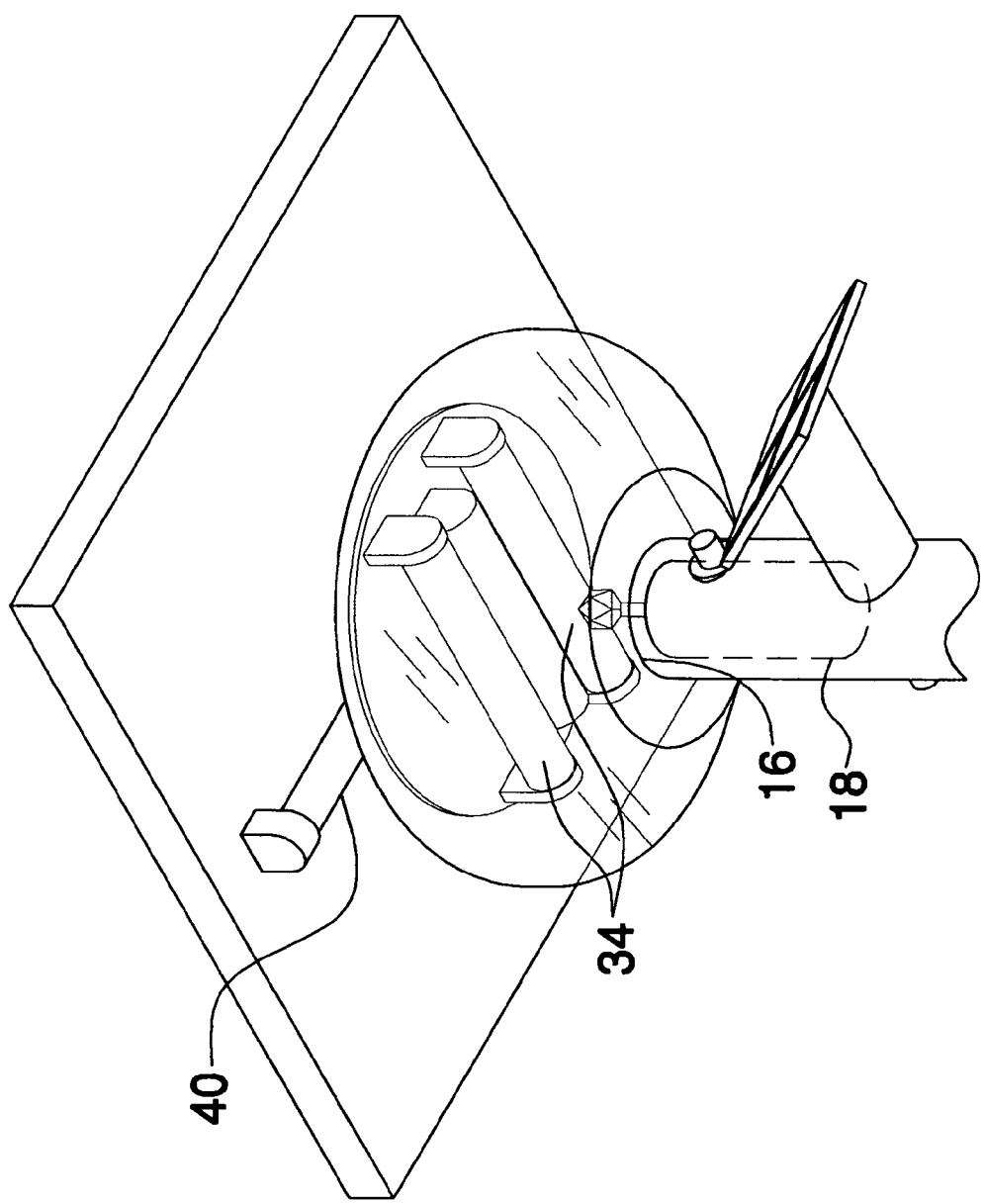
FIG. 3 is a perspective view of the present invention.
Figure 4:
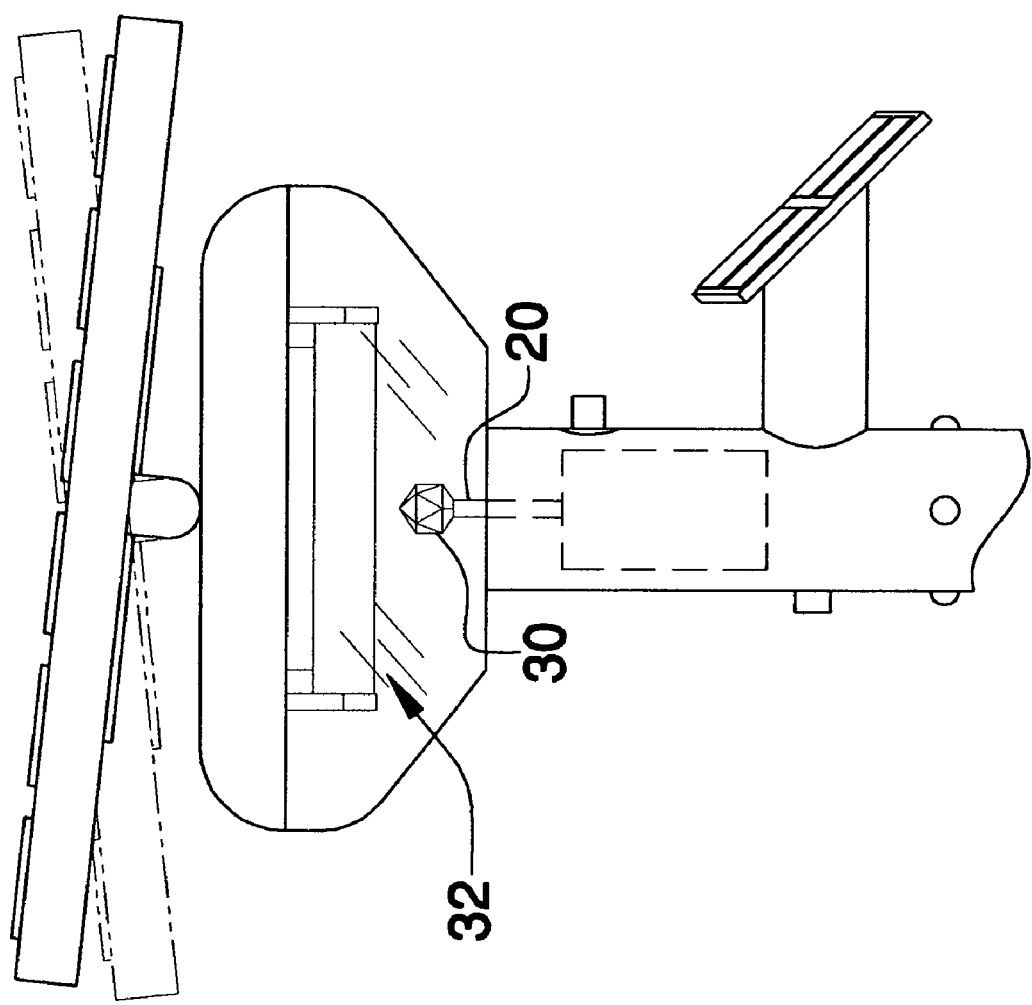
FIG. 4 is an enlarged side view of the present invention.
Figure 5:
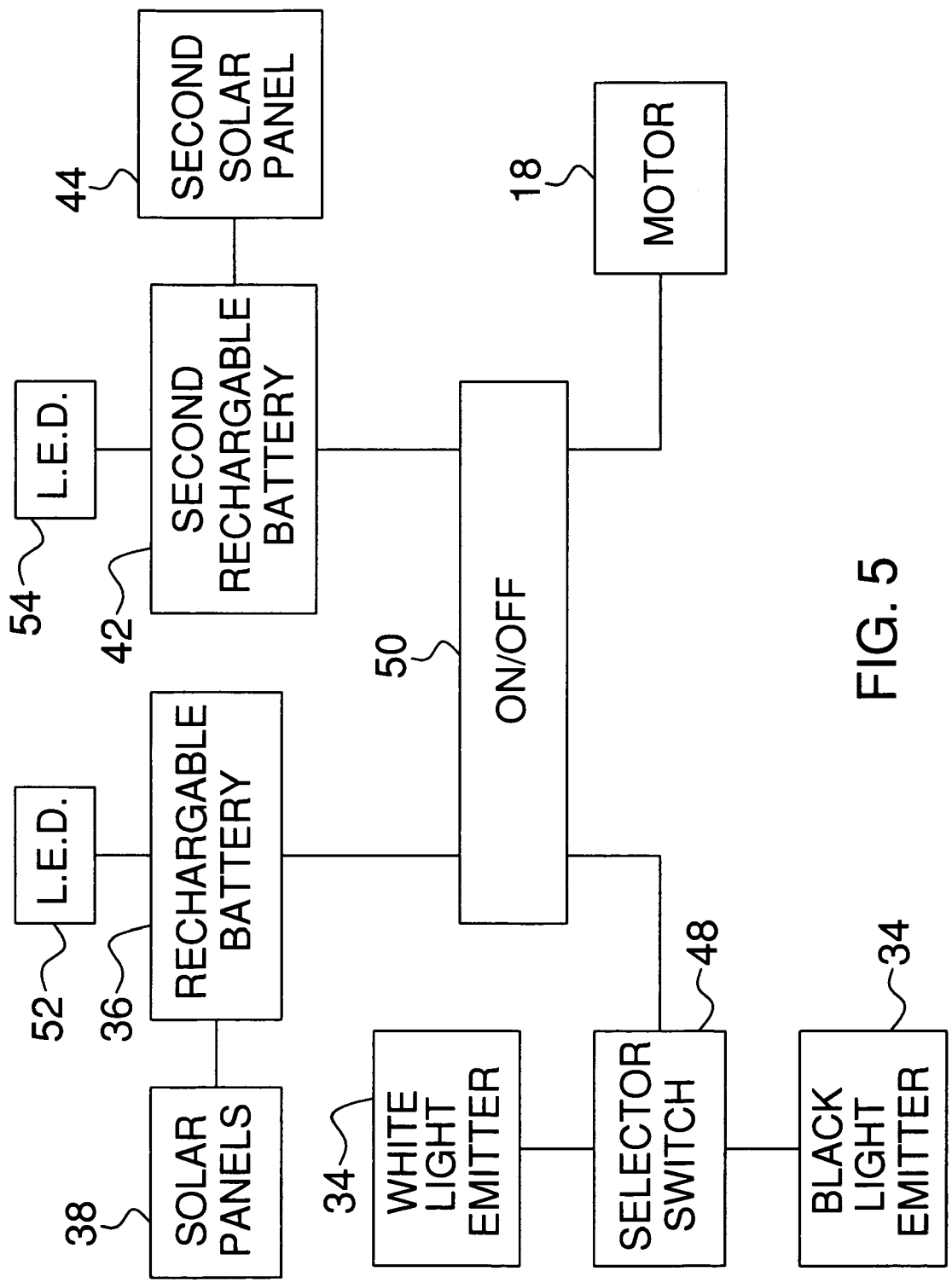
FIG. 5 is a schematic view of the present invention.

With reference now to the drawings, and in particular to FIGS. 1 through 5 thereof, a new grave lighting device embodying the principles and concepts of the present invention and generally designated by the reference numeral 10 will be described.

As best illustrated in FIGS. 1 through 5, the grave marker illumination assembly 10 generally comprises a post 12 that has a bottom end 14 and a top end 16. A motor 18 is mounted in the post 12. An axle 20 is mechanically coupled to the motor 18 and extends upwardly from the top end 16. The motor 18 is configured to rotate the axle 20.

A housing 22 has a bottom wall 24, a top wall 26 and a peripheral wall 28 that is attached to and extends between the top 26 and bottom 24 walls. The housing 22 comprises a substantially transparent material. The housing 22 is positioned on the top end 16 of the post 12. The peripheral wall 28 is frusto-conical and extends outwardly from the bottom wall 24 to the top wall 26. The axle 20 is attached to the housing 22 so that the housing 22 is rotated when the axle 20 rotates. The axle 20 may extend into the housing 22 and have a light reflective element 30 attached thereto. The light reflective element 30 may include a crystal.

A light emitting apparatus 32 is positioned in the housing 22 and is mounted on the top wall 26. The light emitting apparatus 32 is configured to direct light downwardly through the bottom wall 24. The light emitting apparatus 32 includes a plurality of light emitters 34. At least one of the light emitters 34 is adapted for emitting white light and at least one of the light emitters 34 is adapted for emitting black light. The light emitter 34 illuminates the light reflective element 30 so that the light reflective element 30 resembles a candle.

A light power supply is electrically coupled to the light emitting apparatus 32. The light power supply comprises a rechargeable battery 36 and a plurality of solar panels 38 electrically coupled to the rechargeable battery 36. The solar panels 38 are mounted on an upper surface of the top wall 26. The solar panels 38 may be mounted on a pivot member 40 to allow for their pivoting toward sunlight.

A motor power supply is electrically coupled to the motor 18. The motor power supply comprises a second rechargeable battery 42 and a plurality of second solar panels 44 electrically coupled to the second rechargeable battery 42. A rod 46 is attached to and extends laterally away from the post 12. The second solar panels 44 are mounted on a distal end of the rod 46 with respect to the post 12.

A selector switch 48 is operationally coupled to the light emitting apparatus 32 and is configured to selectively switch power to the light emitter 34 emitting white light or the light emitter 34 emitting black light. A power actuator 50 may be electrically coupled to each of the light and motor power supplies for turning each off. Light emitting diodes 52, 54 mounted on the post 12 are electrically coupled to the rechargeable battery 36 of the light power supply and the second rechargeable battery 42 to indicate the batteries 36, 42 are charged.

In use, the post 12 is positioned adjacent to a grave marker 56 so that the light emitting apparatus 32 illuminates the grave marker 56. The black light will generally illuminate the grave marker 56 but the white light may be turned on when a person is present to more generally illuminate the area around the grave marker 56.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grave sight illuminating device comprising:
   a post having a bottom end and a top end;
   a housing having a bottom wall, a top wall and a peripheral wall being attached to and extending between said top and bottom walls, said housing comprising a substantially transparent material, said housing being positioned on said top end of said post;
   a light emitting apparatus being positioned in said housing and being mounted on said top wall, said light emitting apparatus being configured to direct light downwardly through said bottom wall;
   a light power supply being electrically coupled to said light emitting apparatus, said light power supply comprising a rechargeable battery and a plurality of solar panels electrically coupled to said rechargeable battery, said solar panels being mounted on an upper surface of said top wall;
   a motor being mounted in said post, an axle being mechanically coupled to said motor and extending upwardly from said top end, said motor being configured to rotate said axle, said axle being attached to said housing such that said housing is rotated when said axle rotates;
   a motor power supply being electrically coupled to said motor, said motor power supply comprising a second rechargeable battery and a plurality of second solar panels electrically coupled to said second rechargeable battery, a rod being attached to and extending laterally away from said post, said rod being mounted on a distal end of said second solar panels with respect to said post; and
   wherein said post is positioned adjacent to a grave marker such that said light emitting apparatus illuminates the grave marker.

2. The device according to claim 1, wherein said peripheral wall is frusto-conical and extends outwardly from said bottom wall to said top wall.

3. The device according to claim 1, wherein said light emitting apparatus includes a plurality of light emitters, at least one of said light emitters being adapted for emitting white light, at least one of said light emitters being adapted for emitting black light, a selector switch being operationally coupled to said light emitting apparatus and being configured to selectively switch power to said light emitter emitting white light or said light emitter emitting black light.

4. A grave sight illuminating device comprising:
   a post having a bottom end and a top end;
   a motor being mounted in said post, an axle being mechanically coupled to said motor and extending upwardly from said top end, said motor being configured to rotate said axle;
   a housing having a bottom wall, a top wall and a peripheral wall being attached to and extending between said top and bottom walls, said housing comprising a substantially transparent material, said housing being positioned on said top end of said post, said peripheral wall being frusto-conical and extending outwardly from said bottom wall to said top wall, said axle being attached to said housing such that said housing is rotated when said axle rotates, a light reflective element being mounted in said housing;
   a light emitting apparatus being positioned in said housing and being mounted on rod top wall, said light emitting apparatus being configured to direct light downwardly through said bottom wall, said light emitting apparatus including a plurality of light emitters, at least one of said light emitters being adapted for emitting white light, at least one of said light emitters being adapted for emitting black light;
   a light power supply being electrically coupled to said light emitting apparatus, said light power supply comprising a rechargeable battery and a plurality of solar panels electrically coupled to said rechargeable battery, said solar panels being mounted on an upper surface of said top wall;
   a motor power supply being electrically coupled to said motor, said motor power supply comprising a second rechargeable battery and a plurality of second solar panels electrically coupled to said second rechargeable battery, a rod being attached to and extending laterally away from said post, said said being mounted on a distal end of said second solar panels with respect to said post;
   a selector switch being operationally coupled to said light emitting apparatus and being configured to selectively switch power to said light emitter emitting white light or said light emitter emitting black light; and
   wherein said post is positioned adjacent to a grave marker such that said light emitting apparatus illuminates the grave marker.

\* \* \* \* \*